Nov. 3, 1925.

S. W. WOODALL

BEARING ARRANGEMENT

Filed Aug. 28, 1924

1,559,830

INVENTOR.

Samuel W. Woodall

BY Gerald S. Baldwin

ATTORNEY.

Patented Nov. 3, 1925.

1,559,830

UNITED STATES PATENT OFFICE.

SAMUEL W. WOODALL, OF DETROIT, MICHIGAN.

BEARING ARRANGEMENT.

Application filed August 28, 1924. Serial No. 734,682.

*To all whom it may concern:*

Be it known that I, SAMUEL W. WOODALL, a citizen of the United States, residing at Detroit, in the county of Wayne and State of Michigan, have invented a new and useful Improvement in Bearing Arrangements, of which the following is specification.

My invention relates to improvements in bearing arrangements, and more particularly to bearing arrangements for rotary brushes used in vacuum cleaners.

One of the objects of the invention is to so encase the bearings that they will be to a very large extent protected from hair, lint, and other foreign matter which generally collects in the bearings now commonly used, and prevents them from functioning properly.

Another object of the invention is to so arrange the bearings that the rotary brush can be quickly changed, utilizing the bearings already in use; or so that either bearing can be speedily replaced, and the machine with one used bearing and the original brush quickly and easily re-assembled.

A further object of the invention is to provide adjusting means in the bearing housing for raising and lowering the rotary brush. The purpose of this is to permit of adjustment of the height of the brush as the bristles wear.

With these and other objects in view my invention consists in certain novel construction and combination of parts hereinafter more fully described with the aid of the accompanying drawings and claimed.

Figure 1:
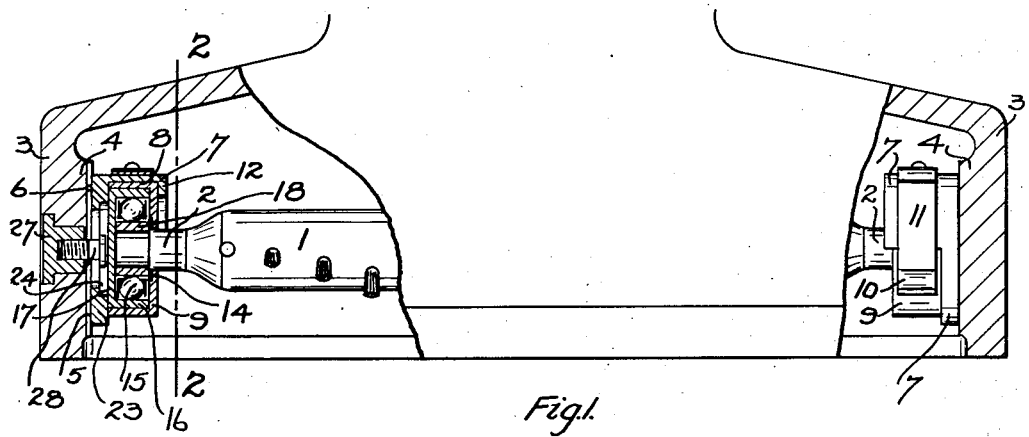
Figure 1 illustrates a front view of my invention showing part of a rotary brush mounted in a vacuum cleaner casing, a sectional view of one bearing and housing, and an elevation of the other bearing housing.
Figure 2:
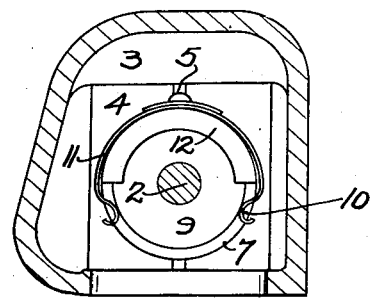
Figure 2 is a section on the line 2—2 of Figure 1.
Figure 3:
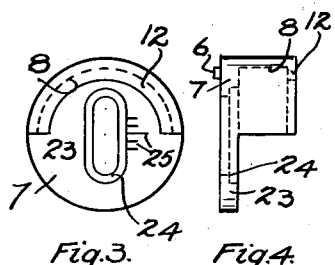
Figures 3 and 4 show detail views of the housing with the spring removed.
Figure 4:
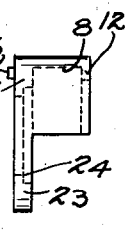
Figure 5:
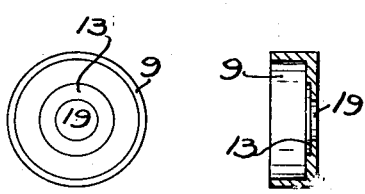
Figures 5 and 6 are details of the bearing casing.
Figure 6:
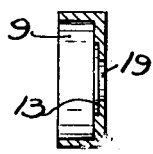

Referring more particularly to the drawings, 1 designates a rotary brush having spindle ends 2 of reduced diameter. On the frame 3, within which the brush is mounted, are pads 4 preferably integral with the said frame. In these pads vertical slots or keyways 5 are supplied which receive the keys or pegs 6 on the outer faces of the housings 7. These housings have substantially semi-circular bearing surfaces 8 adapted to receive the bearing casings 9, which later are held in position therein by means of the inbent ends 10 of the springs 11. The housings 7 may also be supplied with inwardly inclined flange portions 12 if desired.

The casings 9 are provided with holes 19 through which the spindle ends 2 enter, and are counterbored at 13 to receive washers 14, of felt or other suitable material. In order to completely encase the ball bearings 15, the outer races 16 may have annular plates 17 on their outer sides, and the inside diameter of the casings 9 is such that the outer races 16 fit snugly into them. In this way no dust or dirt can reach the ball bearings 15 or the inner races 18 except by passing through the holes 19, and the presence of the washers 14 renders this possibility very remote.

Figure 7:
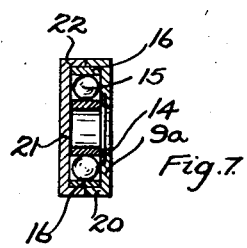
Figure 7 is a sectional view showing a modified form of bearing casing.

It will be noted, however, that the construction just described necessitates the use of special ball bearings with one closed end. When it is desired to use ordinary ball bearings the construction shown in Figure 7 may be employed. The casing 9ª has an annular flange 20 of approximately half the thickness of the outer ball race 16 over which it fits, and a second casing 21 having an annular flange 22 of substantially the same inner and outer diameters as the flange 20 completes the closure.

In the outer faces 23 of the housings 7 vertical T-slots 24 are supplied, at one side of each of which I prefer to mark off graduations 25, so that identical setting of both housings can readily be made. In the frame 3 and pads 4 holes are provided to receive nuts 27 which engage screws 28 inserted through the T-slots. In this way the housings are secured after having been set at the required height. I prefer to insert the screws 28 from within, instead of from the outside, as I find that it facilitates the operation.

Throughout the specification reference has been made to the use of the bearing arrangement in connection with a rotary brush; it is, however, understood that any spindle may be substituted for the brush spindle, and the bearing arrangement employed for mechanisms other than rotary brushes. While in the foregoing I have described the preferred embodiment of my invention, I may make alterations thereto provided the said alterations fall within the scope of what I claim.

What I claim as my invention and desire to secure by Letters Patent is:

1. A bearing arrangement comprising a spindle having ends mounted in bearings positioned within a frame, housings attached to said frame having inwardly inclined segmental bearing surfaces adapted to receive bearing casings, and springs secured to the outer circumferences of said segmental bearing surfaces which are adapted to grip each of said bearing casings at two points on its circumference.

2. A bearing arrangement comprising a spindle having ends mounted in ball bearings positioned within a frame, pads on said frame substantially at right angles to the axis of said spindle, housings attached to said pads and having inwardly inclined segmental bearing surfaces adapted to receive bearing casings, in combination with springs secured to the outer circumferences of said segmental bearing surfaces and adapted to grip each of said bearing casings at two points on its circumference.

3. A bearing arrangement comprising a spindle having ends mounted in ball bearings positioned within a frame, pads on said frame, housings resting against said pads and provided with means for vertical adjustment thereon, said housings having inwardly extending segmental portions the inner surfaces of which are adapted to receive bearing casings within which said ball bearings are housed, in combination with springs secured to the outer face of said segmental bearing surfaces and adapted to grip the outer circumferences of said bearing casings.

4. A bearing arrangement comprising a spindle having ends mounted in enclosed ball bearings positioned within a frame, pads on the inside of said frame, housings provided with T-slots adapted to be secured to said frames by fastening means inserted through said frame and pads and through said T-slots, inwardly projecting segmental bearing surfaces integral with said housings, and spring means for holding said enclosed ball bearings against the inner circumferences of said segmental bearing surfaces.

5. A bearing arrangement comprising a spindle having ends mounted in ball bearings, bearing casings adapted to receive said bearings, the inner faces of said casings being bored for said spindle ends and counterbored to receive washers, in combination with housings to receive said bearing casings, said housings having inwardly disposed segmental portions within which part of the circumferences of said casings are adapted to rest, and springs secured to the outer face of said segmental portions adapted to grip unsupported portions of the circumferences of said casings, in combination with portions of said housings disposed substantially at right angles to the axis of said spindle ends and secured within a frame.

6. A bearing arrangement as described in claim 5, wherein provision is made for vertical adjustment of the housings.

SAMUEL W. WOODALL.